United States Patent Office 3,488,208
Patented Jan. 6, 1970

3,488,208
MULTI-COLORED DYEING OF TEXTILES
Allen J. Jinnette, Greensboro, N.C., assignor to Burlington Industries, Inc., Greensboro, N.C., a corporation of Delaware
No Drawing. Filed Oct. 24, 1966, Ser. No. 588,711
Int. Cl. B05c 1/16; B44c 1/00; B44d 1/54
U.S. Cl. 117—37         12 Claims

ABSTRACT OF THE DISCLOSURE

A process for the production of multi-colored dyed glass textiles is disclosed, wherein glass textiles are pre-wetted with about 10 to about 40% by weight of water, and are thereafter treated with a resinous dyeing bath containing pigments which have been pretreated by flocculating the same with a quantitative amount of a water soluble cationic polyelectrolyte which flocculates the pigment without sedimenting the same. This process is much easier to control and the pigment bath can be made to sustain longer runs without exhaustion problems. The resultant textile colors are also sharper, and the shades of different colors can be more precisely controlled.

---

This invention relates to a process for the production of multicolored dyed glass textiles.

BACKGROUND OF THE INVENTION

The Roth Patent No. 2,955,063, issued Oct. 4, 1960, discloses that, although the glass fabric surface of glass textiles is anionic, the textile yarns and filament float yarns have a higher potential than that of the body of the fabric. This patent teaches the selective coloring of glass textiles by treatment of the pigment bath to effectively lower or change the charge on the pigment particles. The change in the electrostatic charge on the pigment particles was brought about, for example, by acidifying the bath or by the addition of hydroxy ions to the bath. The disclosure of the Roth patent is hereby incorporated by reference.

The Hamiter et al. Patent No. 3,108,897, issued Oct. 29, 1963, discloses a process for coloring glass fiber fabrics, which fabrics have relatively tightly and loosely constructed surfaces, by padding through a padding bath containing anionic pigment particles, a cationic flocculating agent, and a binder, and thereafter heating the fabric to cause the binder to bond the pigment particles on the glass surface. The disclosure of the Hamiter et al. patent is hereby incorporated by reference.

One problem existing in processes exemplified by the Hamiter et al. patent is that the control of the dye system during production is quite difficult, and also that exhaustion difficulties during long runs of the dye bath occur.

OBJECTS OF THE INVENTION

It is an object of this invention to provide a novel process for the multicolor dyeing of glass textiles. It is a further object of the present invention to provide a novel process for the multicolor dyeing of glass textiles of fabrics which makes for the easier control of the dye system and permits longer runs with a dye bath with a minimum of exhaustion difficulties.

Still other further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

In accordance with the present invention, the above objects are accomplished by pretreating the pigment particles prior to their admixture with the other constituents of the dyeing bath. The pretreatment comprises treating a pigment dispersion with the addition of a predetermined amount of a polyelectrolyte flocculating agent. The amount of the flocculating agent employed is substantially the amount required to react, or flocculate, all of the particular pigment particles without sedimentation. Conventional quantitative dyeing procedures can be used to determine the correct amount of flocculating agent to be used with different pigment systems.

DESCRIPTION OF THE INVENTION

Glass textiles, or fabrics, are treated in a conventional padding bath or series of padding baths to impart a multi-color appearance to the textile. The pigment in the padding bath is pretreated by the addition of a polyelectrolyte flocculating agent to a pigment dispersion before the pigment dispersion is added to the bath. The amount of the flocculating agent employed is predetermined by conventional quantitative dyeing procedures.

The advantages of the process of the present invention over the conventional method of flocculating the pigment particles in the dye bath itself is that the necessary amount of the flocculating agent which is required to flocculate the pigment particles alone is subject to fairly exact determination, and such amount may be used to completely flocculate the pigment without substantial sedimentation. In the conventional process where the pigment and the flocculating agent are both added to the dye bath mixture, the flocculating agent may react or adhere to the other materials present in the dye bath mixture. In such an event, it is more difficult to flocculate the pigment particles completely without substantial sedimentation of the flocculated pigment.

The flocculating agent suitable for the pretreatment of the pigment in the present invention may be any of the various organic polyelectrolytes and resinous materials commonly used to cause flocculation in the treatment of water and sewage. As examples of these flocculating agents there may be mentioned Nalco 600 (Nalco Chemical Company), Ucar C–149 (Union Carbide), Primaflox C–3 (Rohm & Haas), ID21–65 (Nalco Chemical Co.), etc.

Generally, the flocculating agents suitable for use in the present invention are those cation active polyelectrolytes or cationic resinous compounds which are also amino-functional. These compounds are chemically identifiable as low molecular weight water-soluble polyamine acrylamides, e.g., the reaction product of a low molecular weight polymethacrylate or polyethylacrylate with a polyamine, such as triethylene tetramine, having two or more amino groups, at least one of which is a primary amino group. This type of reaction product is disclosed in U.S. Patent 2,675,359. Molecular weights in the range of 2,000 to 5,000 may be mentioned as illustrative although products of higher molecular weights, e.g. 10,000 or above, may also be used. Other cationic resinous compounds useful herein include the water-soluble, cationic condensation products of formaldehyde and dicyandiamide or similar compounds containing the grouping

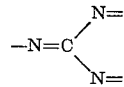

wherein the free valences are satisfied by hydrogen, lower alkyl, phenyl or other aryl radical. A typical example of such a condensation product useful herein is methylol guanidine. Other cationic flocculating agents which may be employed are described in the Hamiter et al. Patent No. 3,108,897.

It has been found highly advantageous to include in the pad composition a silane crosslinking agent containing a reactive grouping. The function of this crosslinking agent is to anchor the resin to the glass surface. Additionally, however, the silane serves as an anchoring agent and catalyst for a subsequently-applied top finishing binder system. The silane crosslinking agent used herein may be an aminoalkyl trialkoxy silane containing at least one amino group and up to about 10 carbon atoms, exclusive of those in the alkoxy groups attached to the silicon atom, each alkoxy group containing from 1–3 carbon atoms. Best results are obtainable with aliphatic silanes containing one or more secondary groups or both primary and secondary groups. Typical examples of such compounds are those represented by the formula:

$$R_1HN(CH_2)_mNH(CH_2)_nSi(OR)_3$$

wherein $m$ and $n$ are integers from 1 to 4, preferably 2 to 3, R is alkyl containing from 1 to 3 carbon atoms and $R_1$ is hydrogen, methyl or ethyl. An especially preferred silane is N-(2-aminoethyl)-3-propylamino trimethoxy silane represented structurally as $$H_2N(CH_2)_2NH(CH_2)_3Si(OCH_3)_3$$

and commercially available as Z–6020 or A–1100. An acrylic modification of Z–6020, available as XZ–8–4032, may also be mentioned as a specific illustration of a silane useful, as may gamma-aminopropyl triethoxy silane.

The amount of the flocculating agent which should be employed is critical and will vary with the particular flocculating agent and the particular pigment to be used. As indicated above, the required amount of the flocculating agent can be easily determined by a quantitative dyeing procedure. Generally, the amount of the flocculating agent employed should be sufficient to cause substantially complete flocculation of the pigment particles but without substantial sedimentation of the pigment particles.

By the process of the present invention, the control of the pigment system is made much easier, and a pigment bath may be made to sustain longer runs without exhaustion problems, by pretreating the pigment dispersion before mixing with the other constituents present in the pigment bath. As a result of the control afforded by the process of the present invention, the textile colors can be made sharper and the shades of different colors can be more precisely controlled.

A binder is generally required to cause a physical adherence between coloring agents and glass fibers during dyeing of the latter. Conevntional binders include resinous materials such as polyacrylic latex, certain of the silicones, polyvinyl alcohol, polyvinyl acetate, etc. Generally, the acrylic resins are the preferred binders. A binder is preferably applied to the fabric along with the coloring materials, which may be an organic or an inorganic pigment, e.g., vat pigments, metallic oxide, carbon black, etc. The coloring baths of the present invention thus contain both the pigment and the binder. Additional binders which may be used are disclosed in the Hamiter et al. Patent No. 3,108,897.

It has also been found desirable to include an epoxy resin in the resinous composition. Epoxy resins generally are suitable for this purpose but the preferred epoxy is one which can react with the silane crosslinking agent. Examples of suitable epoxides include the bisphenol-epichlorhydrin type and epoxidized oils, e.g., epoxy soybean oil or the like.

Generally, the epoxy resin will be used in an amount of 0.5 to 3.0% by weight, based upon the weight of the total padding bath.

In the final resin finish pad bath, it may also be advantageous to include a chrome complex, i.e. a Werner complex compound having an acido group coordinated with the trivalent nuclear chromium atom which is capable of strong coordination with the groupings that exist on the glass fiber surfaces, as described in U.S. Patents 2,356,161 and 2,273,040, in the finish bath. Typical examples of such chrome complexes are Quilon which is Du Pont's stearato chromic chloride and Atcovex Q, a product of Metro-Atlantic, Inc.

The pigment to be used in the process of the present invention must be selected from those which are stable throughout the processing steps, i.e. the pigment must be able to withstand the curing temperature without change. These pigments are well known to those skilled in the art. Examples of the inorganic pigments which can be used are the oxides, sulfites and sulfates of cobalt, chromium, iron, zinc, and cadmium, etc. Examples of organic pigments are the azo coupling dyes, phthalcoyanine, anthraquinone, indanthrene vat dyes, carbon blacks, etc. The dye bath generally contains about 0.5 to 5% by weight of pigment but more or less pigment can be used as desired. The pigment is usually employed in the form of an aqueous dispersion which includes water, pigment and a dispersing agent. These aqueous pigment dispersions are also well known in the art.

The glass fibers treated herein may be of any conventional composition. Typically suitable fibers are those made from the type "E" glass of the following approximate composition wherein parts are by weight:

| | Parts |
|---|---|
| Silicone dioxide | 52–56 |
| Calcium oxide | 16–25 |
| Aluminum oxide | 12–16 |
| Boron oxide | 8–13 |
| Na$_2$O (sodium oxide) | 0–1 |
| Magnesium oxide | 0–6 |

Other suitable glass compositions are shown, for example, in U.S. Patents 2,582,919 and 3,011,929.

The invention is illustrated but not limited by the following examples wherein parts and percentages, unless otherwise stated, are by weight.

In the following examples various pads or treating baths will be mentioned which are for the following composition:

First bath

This bath is water and the object is to produce a damp fabric without a large amount of excess water. Therefore, the fabric is squeezed with pressure high enough to allow only a moisture content of about 10 to about 40% moisture by weight in the fabric leaving this bath. If this moisture content cannot be obtained by squeezing alone, a small amount of drying may be necessary. Generally, a pressure of 2 to 6 tons on the fabric pad rolls is used. This is also the pressure used for other baths or pads.

Second bath

This bath is made of a resinous dispersion: 0.5% amino silane (Dow Corning XZ84032); 4.0% acrylic resin dispersion (Rhoplex HA–8), and 4.0% softener emulsion (Polysoftener 506).

To this resinous dispersion is added the pigment dispersion which has been pretreated with an exact amount of an organic polyelectrolyte. This pretreated pigment dispersion is made by dispersing the pigment in water and then treating the aqueous dispersion with the necessary amount of polyelectrolyte. The exact amount of the polyelectrolyte is critical but can be easily determined by a quantitative dyeing procedure which is known in the art. As indicated above, the object is to cause flocculation of the pigment without substantial sedimentation. Several specific pigment dispersion-polyelectrolyte compositions are given in the examples below.

The softener used is an emulsion of a non-yellowing fatty softener. Example of suitable softeners are Polysoftener 506 (Polymer Industries), Valsoft FR-4 (Valchem), Emery 3346-S (Emery Industries) and BI-7008 (Mortex Chemical Products Co.), etc. These softeners are generally emulsions or are fatty materials which have self-emulsifying characteristics. Typical examples of some such softeners include: glycerol monostearate (emulsion), polyethylene glycol monostearate (self-emulsifiable), epoxidized soybean oil (emulsion), esters of saturated fatty acids, stearic acid amide (emulsion), condensates of saturated fatty acids with alkanolamine such as diethanol amine stearic acid amide (self-emulsifiable).

Third bath

This is also a pigment bath and the resin mix used in this bath is the same as the second bath. The pigment dispersion used in this bath, however, is not pretreated.

Fourth bath

This bath is a top finish treatment and is made of the following: 4% acrylic resin, and 1% Quilon.

Quilon is a chrome complex such as described in U.S. Patents 2,356,161 and 2,273,040. Another chrome complex which can be used is Atcovex Q, sold by Metro-Atlantic, Inc. The preferred acrylic resin is a crosslinking acrylic resin containing carboxylic acid groupings, hydroxyl groupings and methyl, ethyl or other side-chain hydrocarbon groupings. Examples of preferred acrylic resins are: Rhoplex HA-8 (Rohm & Haas), Polycryl 7F1 (Polymer Industries), Polycryl 7F12 (Polymer Industries) and Hycar 2600-94 (B. F. Goodrich), etc.

In order to obtain the best results, the same resin and softener should be used in the second and third baths. Although the amounts of various constituents are specifically given above, these figures can obviously be varied to obtain a particular and desired result. For example, the amounts of resin and softener can be varied to produce the desired degree of firmness or softness of the fabric. Furthermore, the amounts of these materials to be used will to some extent depend on the nature and construction of the fabric.

Generally, the resin will be cured by heating in a curing oven at a temperature of about 250 to 375° F. for about one to ten minutes.

Example I

A glass fabric having a count of 56 x 54 single 150's with the filling yarns periodically floated at regular intervals over from 3 to about 9 warp yarns was first heat cleaned using the process described in U.S. Patent No. 2,970,934. The heat cleaning process of U.S. Patent No. 3,012,848 could also be used to achieve the same result.

The heat cleaned fabric was immersed in the first bath of water and then squeezed free of excess water. The damp fabric so obtained contained about 30% moisture.

This damp glass fabric was then passed through the second bath which contained, in addition to the three component resinous dispersions mentioned above, a pretreated pigment mixture. The pretreated pigment mixture was 2% SXN Brown R pigment (Interchemical Co.) treated with 1.6% of a 10% solution of Nalco 600 polyelectrolyte. The procedure for making this pigment mixture was to first disperse the pigment in a suitable quantity of water and then the Nalco 600 solution added with mixing. After the pretreated pigment mixture was mixed with the resinous dispersion, water was added to bring the final composition to 100%.

The fabric passed through the above bath was squeezed through rollers to remove excess liquid and dried. The dried fabric showed pronounced color in the areas of the floated or effect yarn whereas in the areas of the non-effect yarn the fabric was essentially not colored or showed only a slight shade of color.

The partially dyed fabric was then passed through the third bath which, in addition to the resinous dispersion, contained an aqueous dispersion of untreated 2% SXN Brown R. The padded fabric was again squeezed and dried. The entire fabric was colored brown at this point but the areas of the effect yarn showed a deeper or dark shade of color than the areas of non-effect yarn.

Finally, the fabric was treated in the fourth bath containing the top finish. From this bath the fabric was dried and cured by the application of heat (3 minutes at 350° F.).

It should be noted that although the third bath in this specific example contained untreated pigment of the same type as was used in the second bath, it is obvious that a differently colored pigment or a pigment having a different shade could have been employed in the third bath to produce still different contrasts between the areas of effect and non-effect yarns.

Example II

Example I was repeated except that the treated pigment mixture used in the second bath was made by first dispersing 0.5% Lumatex Yellow RR (BASF) in water and then treating with 0.83% of a 10% solution of Nalco 600. This treated pigment mixture was then added to the second bath as before. The pigment in the third bath was 0.5% Lumatex Yellow RR without the Nalco 600 treatment. Results similar to that of Example I were obtained.

Example III

Example I was again repeated using 0.1% SXN Black 2K (Interchemical Co.) treated with 0.13% of a 10% solution of Nalco 600 in the second bath. A 0.1% SXN Black 2K pigment aqueous dispersion was used in the third bath. Again, the areas of the effect yarn showed a distinctly deeper shade of color than the areas of non-effect yarn.

It is possible, and sometimes desirable, to vary the above procedure by eliminating one or more baths. Thus the initial water bath may be eliminated and the fabric passed into the second bath dry. This will result in a fabric with less overall contrast than above. Again, the second and third baths may be combined by mixing both the flocculated or treated and unflocculated pigments in the same bath. In some instances, it may be desired to eliminate the third bath entirely to give a tone-on-tone effect. Additionally, the fabric may be passed through baths No. 2 and No. 4 only to produce a tone-on-tone effect with less overall contrast than is the case if bath No. 1 is also employed.

As indicated above, the pretreating of the pigment with an optimum amount of the flocculating agent insures that the pigment particles will be substantially completely flocculated without appreciable sedimentation. Furthermore, by separately pretreating the pigment, the resinous components of the dye bath will be less affected by the flocculating agent. The result is to make the control of the dye bath easier and to make the dye bath capable of sustaining longer runs.

The term "glass textile" as used herein is to be construed to mean glass fabrics and glass yarns—i.e., products made from glass fibers or filaments.

The padding bath, which contains the dispersion, a liquid medium or vehicle, and a binder, also preferably contains a softening agent to improve water repellency of the colored fabric, to lubricate the glass fibers, and to generally improve the hand of the fabric. The dispersion may also contain a dulling and anti-slip agent, for example, titanium dioxide pigment or colloidal silica.

A typical pretreated pigment dyeing bath for glass textiles may contain as solids, from 0.1 to 8% pigment containing the proper amount cationic flocculating agent, from 2 to 8% resin binder, from 0.1 to 8% softening agent, and from 0.1 to 4% epoxy resin. The rest of the bath is water or other liquid media.

What is claimed is:
1. In a process for the production of multicolored glass textiles, said process comprising prewetting glass textiles having areas of different dye receptivity to a water content of from about 10 to about 40% by weight and treating said textiles with a resinous dyeing bath containing flocculated pigment therein, the improvement comprising contacting said prewetted glass textiles with said resinous dyeing bath, wherein the pigment in said resinous dyeing bath is pretreated before mixing said pigment into said dyeing bath, said pretreatment comprising the step of flocculating said pigment with a quantitative amount of a water-soluble cationic polyelectrolyte so as to substantially flocculate said pigment without sedimenting the same.

2. A process as claimed in claim 1 wherein said water-soluble cationic polyelectrolyte is a water-soluble polyamine acrylamide.

3. A process as claimed in claim 2 wherein said process further comprises treating said glass textiles, after treatment with said resinous dye bath, with a top finish composition.

4. A process as claimed in claim 3 wherein said process further comprises dyeing said glass fabric with a dye bath containing unflocculated pigment prior to said top finish composition treatment and subsequent to resinous dye bath treatment.

5. A process as claimed in claim 2 wherein said process further comprises dyeing said glass textile in a resinous dye bath containing both unflocculated pigment and pretreated, flocculated pigment.

6. The process as claimed in claim 1, wherein said glass textile is prewetted by passing said textile through a water bath and thereafter padding and/or drying to a water content of from about 10 to about 40% by weight.

7. A process as claimed in claim 6 wherein said process further comprises treating said glass textile with a top finish composition.

8. A process as claimed in claim 7 wherein said process further comprises dyeing said dyed glass textile with a dye bath containing unflocculated pigment prior to said top finish composition treatment and subsequent to said resinous dyeing bath treatment.

9. A process as claimed in claim 8 wherein said top finish composition comprises 0.5 to 5% of a thermoplastic resin and a chrome complex.

10. The process as claimed in claim 9 wherein said thermoplastic resin is acrylic resin.

11. The process as claimed in claim 1 wherein said resinous dye bath comprises from 0.1 to 1.5% of a silane crosslinking agent, 2 to 8% of an acrylic copolymeric resin dispersion, 0.1 to 8% of an epoxidized oil emulsion, 0.1 to 4% of epoxy resin, 0.1 to 8% of flocculated pigment.

12. A process as claimed in claim 1 wherein more than one bath is used, the glass textile is padded after each bath treatment, and the pressure of the pad is within the range of about two to about six tons.

References Cited

UNITED STATES PATENTS

| | | | |
|---|---|---|---|
| 3,108,897 | 10/1963 | Hamiter et al. | 117—37 |
| 3,304,195 | 2/1967 | Ackerman | 117—37 |

FOREIGN PATENTS

| | | |
|---|---|---|
| 736,590 | 9/1955 | Great Britain. |

WILLIAM D. MARTIN, Primary Examiner

D. COHEN, Assistant Examiner

U.S. Cl. X.R.

117—54, 76, 126